United States Patent

Wang et al.

Patent Number: 5,519,099
Date of Patent: May 21, 1996

[54] ORGANOMETALLIC CATALYSTS CONTAINING HYDROTRIS)PYRAOLYL) BORATE AND CYCLOPENTADIENYL GROUPS, AND PROCESSES OF EMPLOYING THE SAME

[75] Inventors: Shian-Jy Wang, Hsinchu; Yi-Chun Chen, Taichung; Shu-Hua Chan, Miao-Li Shiann; Jing-Cherng Tsai, San-Min District Kaoshiung; Yu-Hwa E. Sheu, Hsinchu, all of Taiwan

[73] Assignee: Industrial Technology Research Institute, Hsinchu Hsien, Taiwan

[21] Appl. No.: 481,113

[22] Filed: Jun. 7, 1995

[51] Int. Cl.$^6$ ................................................. C08F 4/642
[52] U.S. Cl. ......................... 526/132; 526/134; 526/352; 526/348.2; 502/103; 502/117; 502/132; 556/8
[58] Field of Search ........................... 526/132, 133, 526/134; 556/8; 502/103, 117, 132

[56] References Cited

U.S. PATENT DOCUMENTS

| | | | |
|---|---|---|---|
| 4,870,042 | 9/1989 | Kohara et al. | 502/114 |
| 5,237,069 | 8/1993 | Newman | 548/110 |
| 5,312,794 | 5/1994 | Kelsey | 502/117 |

OTHER PUBLICATIONS

H. Yasuda and H. Tamai (1993) Progr. Polym. Sci, 18, 1139, pp. 1118–1123 (excerpt).

Primary Examiner—Mark Nagumo
Attorney, Agent, or Firm—W. Wayne Liauh

[57] ABSTRACT

A catalyst composition is disclosed for catalyzing the polymerization and copolymerization reactions of ethylene monomers, with or without another olefin monomer. The catalyst composition comprises a metallocene compound represented by the the formula of $(C_5R_nH_{5-n})(L)MXY$ or the formula of $(C_5R_nH_{5-n})(L)MX^+A^-$; wherein: (a) $C_5R_nH_{5-n}$ is a substituted or unsubstituted cyclopendadienyl group; (b) L is tetrapyrazolyl borate, hydrotrispyrazolyl borate, dihydrotrispyrazolyl borate or hydrotris-3,5-dimethyl; (c) M is Group IIIB, Group IVB, or Group VB transitional metal; (d) X is a $C_1$ to $C_4$ alkyl or alkenyl group, an aromatic group, an alkylaryl, a halogen, a hydrogen, or a silane group; (e) Y, which can the same as or different from X, is a $C_1$ to $C_4$ alkyl or alkenyl group, an aromatic group, an alkylaryl, a halogen, a hydrogen, or a silane group; and (f) $A^-$ is non-coordinated or loosely coordinated bulky anion. Examples of the $(C_5R_nH_{5-n})(L)MXY$ and $(C_5R_nH_{5-n})(L)MX^+A^-$ metallocene compounds are represented by the following formulas:

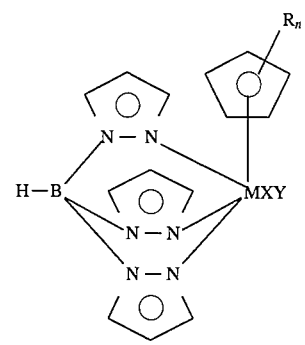

and

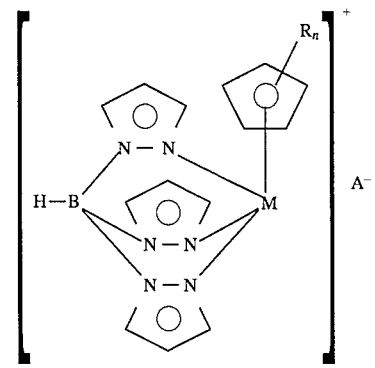

respectively.

17 Claims, No Drawings

ORGANOMETALLIC CATALYSTS CONTAINING HYDROTRIS)PYRAOLYL) BORATE AND CYCLOPENTADIENYL GROUPS, AND PROCESSES OF EMPLOYING THE SAME

FIELD OF THE INVENTION

The present invention relates to novel metallocene, or organometallic, compounds for use as catalysts in the production of polyolefins. More specifically, the present invention relates to the preparation of a family of novel organometallic catalysts, and their applications in ethylene polymerization as well as in the copolymerization of ethylene with α-olefin, diolefin, acetylenic unsaturated monomers, and cyclic olefins.

BACKGROUND OF THE INVENTION

Ziegler-Natta catalysts are the most commonly employed catalysts in the commercial α-olefin polymerization processes. This is especially true for the production of polyethylene or ethylene/α-olefin copolymers. A Ziegler-Natta catalyst typically contains a mixture of titanium, vanadium, and/or aluminum complexes. Several shortcomings have been observed with the Ziegler-Natta catalyst in the polymerization or copolymerization of ethylene/α-olefin. These include: relatively broad molecular weight distribution, inadequate light transparency, high content of extractable substance, and relatively low monomer concentration in the polymerization process.

European Patent App. No. 129368 (1984) ("Eur-368") discloses a catalyst composition comprising bis(cyclopentadienyl) zirconium dichloride as a primary catalyst and methyl aluminoxane as a co-catalyst for ethylene polymerization. The molecular weight of polyethylene obtained using the Eur-368 catalyst can reach 140,000, with a molecular weight distribution of 3.5.

European Patent App. No. 128045 (1984) ("Eur-045") discloses a catalyst composition comprising a bis(cyclopentadienyl) zirconium dialkyl and a bis(cyclopentadienyl) titanium dialkyl catalyst for ethylene polymerization. The molecular weight of the polyethylene polymer that can be obtained using the Eur-045 catalyst was increased to 323,000; however, the molecular weight distribution was also increased to 5.51.

European Patent App. No. 260999 (1988) ("Eur-999") discloses a catalyst composition comprising bis(n-butylcyclopentadienyl) zirconium chloride as a primary catalyst and methyl aluminoxane as a co-catalyst for ethylene polymerization. The molecular weight of polyethylene obtained using the Eur-999 catalyst can reach 185,000, with a favorable molecular weight distribution of 1.9. However, the Eur-999 catalyst has an activity of only 461 gPE/mmole Zr·hr.

European Patent App. No. 226463 (1987) ("Eur-463") discloses the use of bis(cyclopentadienyl) titanium methyl chloride as a catalyst for ethylene polymerization. The use of a bulky boron-containing anion instead of aluminoxane as a co-catalyst or active agent in ethylene polymerization was first disclosed in European Patent App. No. 277003 and 277004 (1988) ("Eur-003" and "Eur-004"), in which tributylammonium tetra(pentaflurophenyl) borate and 7,8-dicarborane were used as a co-catalyst.

Japanese Patent App. No. 63218707 (1988) ("Japan-707") discloses a catalyst composition for ethylene polymerization; it comprises bis(cyclopentadienyl) titanium dichloride as a primary catalyst and the co-catalyst contains methyl aluminoxane and 1,2-dichloroethane. The Japan-707 catalyst was able to improve the catalyst activity in ethylene polymerization to 21,400 gPE/mmole Ti·hr. More recently, European Patent App. No. 384171 (1990) discloses that by using bis(cyclopentadienyl) titanium dichloride and ethyl aluminoxane as catalysts, the catalyst activity in ethylene polymerization can be further improved to 131 KgPE/gTi·hr. In World Patent Application No. W09109882 (1991), it was disclosed that the molecular weight of polyethylene can be increased to 594,000 with a molecular weight distribution of 2.15, using a catalyst composition that contains bis(cyclopentadienyl) dimethyl and dimethylanilinetetra(pentafluorophenyl) borate. U.S. Pat. No. 5,258,475 discloses the use of a catalyst composition for ethylene polymerization which contains bis(cyclopentadienyl) zirconium dichloride, aluminum trimethyl (i.e., trimethylaluminum), and tributyltin oxide.

A different type of catalysts have also been disclosed in the prior art which are organometallic compounds containing bis(cyclopentadienyl) and aromatic rings such as indene or fluorene as ligands. In European Patent App. No. 303519 (1987), it is disclosed a catalyst composition containing diindenyl zirconium dichloride, methyl aluminoxane and tetraethyl silicate for use in the copolymerization of ethylene/1-hexene; the catalyst composition exhibited a catalyst activity of 16,800 gPE/gZr·hr. The two indene molecules can be linked with carbon or silicon atoms, such as the dimethylsilanediyl group disclosed in U.S. Pat. No. 4,871,705 (1990), or the isopropyl group disclosed in European Patent App. No. 413326 (1991).

Examples of using fluorene compounds as catalyst in ethylene polymerization include those disclosed in European Patent App. No. 530908 (1993), in which bis(cyclopentadienyl) and a fluorene group are π-bonded to a metal; in European Patent App. No. 528207 (1992), in which an indene group and a fluorene group are π-bonded to a metal. In both disclosures, isopropyl is used as a link. In Canada Pat. No. 2,067,525 (1992) ("Can-525"), two fluorene groups are linked to a zirconium compound via an ethylene group to prepare a catalyst for use in ethylene polymerization. With the catalyst disclosed in the Can-525, the molecular weight of the polyethylene prepared can reach 71,900, with a density of 0.97. European Patent App. No. 566988 (1994) discloses the use of fluorene zirconium compounds in the ethylene/5-norbornene copolymerization.

A number of organometallic catalysts containing only mono (cyclopentadienyl) as ligands have also been disclosed. These include the catalyst composition of $C_5Me_4SiMe_2NC(CH_3)_2ZrCl_2$ and methyl aluminoxane disclosed in European Patent App. No. 416815 (1991) for use in the copolymerization of ethylene and 4-methyl-1-pentene or 1-hexene; and the $CsMe_4SiMe_2NC(CH_3)_2ZrMe_2$ and $PhNMe_2H^+B(C_6F_5)_4^-$ disclosed in WO 9200333 ("WO-333") (1992). With the catalyst composition disclosed in WO-333, the molecular weight of polyethylene can reach 900,000. In U.S. Pat. No. 5,214,173, it is disclosed a catalyst composition for the polymerization of polyethylene which contains $(C_5Me_5)(C_2B_9H_{11})ZrMe$ and triisobutyl-aluminum; the molecular weight of polyethylene produced was 182,000.

SUMMARY OF THE INVENTION

The primary object of the present invention is to develop a novel metallocene, or organometallic, composition for use as a catalyst in the polymerization of ethylene and the copolymerization of ethylene with α-olefin, diolefin, acetylenic unsaturated monomers, and cyclic olefins. More specifically, the primary object of the present invention is to develop a novel metallocene for use in ethylene polymerization and copolymerization which can provide high catalyst activity, narrow molecular weight distribution, high transparence, and/or low extractable content, and can utilize high co-monomer concentration in the copolymerization process. Alternative, the primary object of the present invention is to disclose a catalyst composition, which contains the metallocene catalyst described above and may contain other co-catalysts, for improved polymerization-/copolymerization of ethylene monomers, with or without other olefin monomers.

The catalyst composition disclosed in the present invention for catalyzing the polymerization and copolymerization of ethylene monomers comprises a metallocene compound represented by the formula $(C_5R_nH_{5-n})(L)MXY$ or the formula $(C_5R_nH_{5-n})(L)MX^+A^-$ wherein:

(a) $C_5R_nH_{5-n}$ is a substituted or unsubstituted cyclopentadienyl group;

(b) L is tetrapyrazolyl borate, hydrotrispyrazolyl borate, dihydrotrispyrazolyl borate or hydrotris-3,5-dimethyl pyrazolyl borate;

(c) M is Group IIIB, Group IVB, or Group VB transitional metal;

(d) X is a $C_1$ to $C_4$ alkyl or alkenyl group, an aromatic group, an alkylaryl, a halogen, a hydrogen, or a silane group; an aromatic group, an alkylaryl, a halogen, a hydrogen, or a silane group;

(f) A is non-coordinated or loosely coordinated bulky anion.

An example of the $(C_5R_nH_{5-n})(L)MXY$ metallocene compound disclosed in the present invention, which contains a hydrotrispyrazolyl borate group, is represented by the following formula:

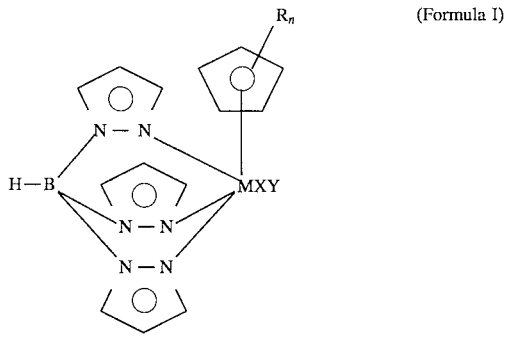

(Formula I)

wherein $R_n$ is the same as the designation "$C_5R_nH_{5-n}$", both represent a substituted or unsubstituted cyclopentadienyl group.

An example of the $(C_5R_nH_{5-n})(L)MX^+A^-$ metallocene compound disclosed in the present invention which contains a hydrotrispyrazolyl borate group is represented by the following formula:

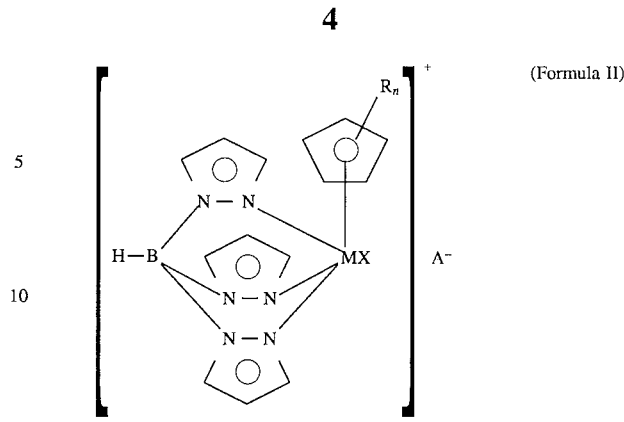

(Formula II)

As in the above example, $R_n$ represents the same as the designation as "$C_5R_nH_{5-n}$", both represent a substituted or unsubstituted cyclopentadienyl group, and $A^-$ represents a non-coordinated or loosely coordinated bulky anion.

Several preferred embodiments of the metallocene catalysts have been synthesized in the present invention. These include:

(a) $(\eta^5\text{-}C_5H_5)[HB(PZ)_3]ZrCl_2$,
(b) $(\eta^5\text{-}C_5H_5)[H_2B(PZ)_2]TiCl_2$
(c) $(\eta^5\text{-}C_5Me_5)[HB(PZ)_3]HfCl_2$,
(d) $(\eta^5\text{-}C_5Me_5)[HB(PZ)_3]ZrCl_2$,
(e) $(\eta^5\text{-}C_5H_5)[HB(PZ)_3]Zr(CH_3)_2$,
(f) $(\eta^5\text{-}C_5H_5)[H_2B(PZ)_2]Ti(CH_3)_2$,
(g) $(\eta^5\text{-}C_5Me_5)[HB(PZ)_3]Hf(CH_3)_2$,
(f) $(\eta^5\text{-}C_5Me_5)[HB(PZ)_3]Ti(CH_3)_2$.

In the above examples, $\eta^5\text{-}C_5H_5$ represents a non-substituted cyclopentadienyl group, Me represents a methyl group, $\eta^5\text{-}C_5Me_5$ represents a substituted cyclopentadienyl group wherein all the hydrogen atoms have been substituted with Me groups, and PZ represents a pyrazolyl group.

The catalyst composition for catalyzing the polymerization and copolymerization of ethylene monomers disclosed in the present invention can further comprise an alkyl aluminoxane, wherein the alkyl aluminoxane contains a repeating unit represented by the following formula:

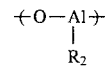

wherein $R_2$ is a $C_1$ to $C_4$ alkyl or alkenyl group, or an aromatic or alkylaryl group.

Preferably, the alkyl aluminoxane is provided such that the ratio between the aluminum atoms and the Group IIIB, Group IVB, or Group VB metal atoms would range from 15:1 to $3\times10^4$:1.

In addition to the alkyl aluminoxane disclosed above, the catalyst composition for catalyzing the polymerization and copolymerization of ethylene monomers disclosed in the present invention can further comprise a trisalkylaluminum or a bisalkylaluminum, wherein the alkyl groups $C_1$ to $C_8$ alkyl groups. Preferably, the alkyl aluminoxane and the tris- or bis-alkylaluminum are provided such that the ratio between the total aluminum atoms and the Group IIIB, Group IVB, or Group VB metal atoms ranges from 15:1 to $3\times10^4$:1.

DETAILED DESCRIPTION OF THE PREFERRED EMBODIMENT

The present invention discloses a process and catalyst for the polymerization of polyethylene as well as the copolymerization of ethylene with α-olefin, diolefin, acetylenic unsaturated monomers, and cyclic olefins. The catalyst disclosed in the present invention comprises a metallocene, or organometallic, compound represented by the following formulas:

$(C_5R_nH_{5-n})(L)MXY$ and $(C_5R_nH_{5-n})(L)MX^+A^-$ wherein:

(a) $C_5R_nH_{5-n}$ is a substituted or unsubstituted cyclopentadienyl group;

(b) L is tetrapyrazolyl borate, hydrotrispyrazolyl borate, dihydrotrispyrazolyl borate or hydrotris-3,5-dimethyl borate;

(c) M is Group IIIB, Group IVB, or Group VB transitional metal;

(d) X is a $C_1$ to $C_4$ alkyl or alkenyl group, an aromatic group, an alkylaryl, a halogen, a hydrogen, or a silane group;

(e) Y, which can the same as or different from X, is a $C_1$ to $C_4$ alkyl or alkenyl group, an aromatic group, an alkylaryl, a halogen, a hydrogen, or a silane group; and (f) A is non-coordinated or loosely coordinated bulky anion.

An example of the $(C_5R_nH_{5-n})(L)MXY$ metallocene catalyst disclosed in the present invention which contains a hydrotrispyrazolyl borate group is represented by the following formula:

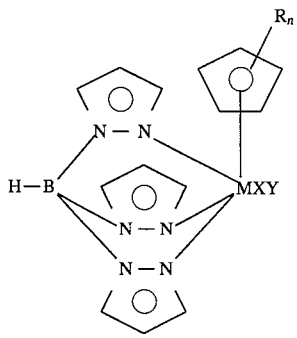

wherein $R_{n \text{ is the same as}}$ the designation "$C_5R_nH_{5-n}$", both represent a substituted or unsubstituted cyclopentadienyl group.

An example of the $(C_5R_nH_{5-n})(L)MX^+A^-$ metallocene catalyst disclosed in the present invention which contains a hydrotrispyrazolyl borate group is represented by the following formula:

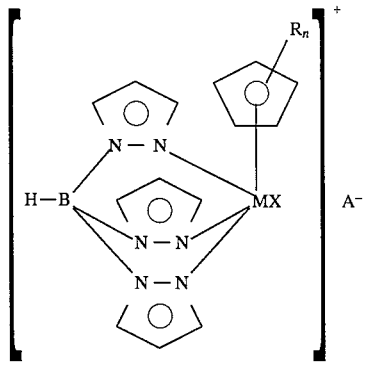

As in the above example, $R_n$ is the same as the designation "$C_5R_nH_{5-n}$", both represent a substituted or unsubstituted cyclopentadienyl group, and $A^-$ represents a non-coordinated or loosely coordinated bulky anion.

Several preferred embodiments of the metallocene catalysts have been synthesized in the present invention. These include: $(\eta^5-C_5H_5)[HB(PZ)_3]ZrCl_2$, $(\eta^5-C_5H_5)[H_2B(PZ)_2]TiCl_2$, $(\eta^5-C_5Me_5)[HB(PZ)_3]HfCl_2$, $(\eta^5-C_5Me_5)[HB(PZ)_3]ZrCl_2$, $(\eta^5-C_5H_5)[HB(PZ)_3]Zr(CH_3)_2$, $(\eta^5-C_5H_5)[H_2B(PZ)_2]Ti(CH_3)_2$, $(\eta^5-C_5Me_5)[HB(PZ)_3]Hf(CH_3)_2$, $(\eta^5-C_5Me_5)[HB(PZ)_3]Ti(CH_3)_2$, etc.

In the above examples, $\eta^5-C_5H_5$ represents a non-substituted cyclopentadienyl group, Me represents a methyl group, $\eta^5-C_5Me_5$ represents a substituted cyclopentadienyl group wherein all the hydrogen atoms have been substituted with Me groups, and PZ represents a pyrazolyl group.

The catalyst composition for catalyzing the polymerization and copolymerization of ethylene monomers disclosed in the present invention can further comprise an alkyl aluminoxane wherein said alkyl aluminoxane contains a repeating unit represented by the following formula:

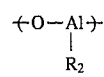

wherein $R_2$ is a $C_1$ to $C_4$ alkyl or alkenyl group, or an aromatic or alkylaryl group.

Preferred embodiments of the alkyl aluminoxanes for use in the present invention include methyl aluminoxane and ethyl aluminoxane. Preferably, the alkyl aluminoxane is provided such that the ratio between the aluminum atoms and the Group IIIB, Group IVB, or Group VB metal atoms would range from 1:15 to $3\times10^4:1$.

In addition to the alkyl aluminoxane disclosed above, the catalyst composition for catalyzing the polymerization and copolymerization of ethylene monomers disclosed in the present invention can further comprise a trisalkylaluminum or a bisalkylaluminum, wherein the alkyl groups $C_1$ to $C_8$ alkyl groups. Preferably, the alkyl aluminoxane and the tris- or bisalkylaluminum are provided such that the ratio between the total aluminum atoms and the Group IIIB, Group IVB, or Group VB metal atoms ranges from 15:1 to $3\times10^4:1$. Preferred embodiments of the tris- or bisalkylaluminum include triisopropylaluminum.

The catalyst disclosed in the present invention can also be utilized in other processes, such as the polymerization of syndiotactic polystyrene (sPS), syndiotactic polypropylene (sPP), and rubber oxidation.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

EXAMPLE 1

Synthesis of $(\eta^5-C_5H_5)$ $[HB(PZ)_3]ZrCl_2$ 300 mg of $CpZrCl_3$ (Cp represents a unsubstituted cyclopentadienyl group, i.e., $\eta^5-C_5H_5$) and 20 ml of dimethoxyethane (DME) were reacted at room temperature for 10 minutes when the solution turned into yellowish green. Then n-pentane was added to obtain a milky white precipitate. After filtration, 200 mg of $CpZrCl_3(DME)$ was obtained, representing a reaction yield of 51%.

The 200 mg $CpZrCl_3(DME)$ were reacted with $KHB(C_3H_3N_2)_3$ in a dichloromethane solvent at room temperature and under stirring for 5 hours. After filtering a whitish precipitate, the filtrate was recrystallized using toluene. This produced 100 mg of white crystal Cp(HB(PZ)$_3$)ZrCl$_2$, or ($\eta^5$-C$_5$H$_5$) [HB(PZ)$_3$]ZrCl$_2$ ($\eta^5$ means 5-coordinated and PZ represent a pyrazolyl group), representing a reaction yield of 40%.

EXAMPLE 2

Preparation of ($\eta^5$-C$_5$H$_5$) [H$_2$B(PZ)$_2$]TiCl$_2$ 219 mg of CpTiCl$_3$ and 186 mg of KH$_2$B(C$_3$H$_3$N$_2$) were reacted in a dichloromethane solvent at 0° C. for 3 hours to obtain a white precipitate and an orange solution. After filtering the white precipitate, the filtrate was recrystallized with dichloromethane and ether. This produced an orange-colored crystal Cp(H$_2$B(PZ)$_2$)TiCl$_2$, which is also described as ($\eta^5$-C$_5$H$_5$) [H$_2$B(PZ)$_2$]TiCl$_2$.

EXAMPLE 3

Preparation of ($\eta^5$-C$_5$Me$_5$)[HB(PZ)$_3$]HfCl$_2$ 665 mg of ($\eta^5$-C$_5$Me$_5$)HfCl$_3$ and 400 mg of KHB(PZ)$_3$ were dissolved in dichloromethane and reacted at room temperature for 18 hours. During the reaction, the color of the solution was gradually changed from light purple to opaque white color. After filtration to remove KCl, the filtrate was removed and recrystallized with toluene to obtain a white crystal ($\eta^5$-C$_5$Me$_5$) [HB(PZ)$_3$]HfCl$_2$. The reaction yield was 58%.

EXAMPLE 4

Preparation of ($\eta^5$-C$_5$Me$_5$) [HB(PZ)$_3$]ZrCl$_2$

The reaction procedure in Example 4 was identical to that in Example 2, except the reactant contained 142 mg of LiC$_5$Me$_5$ and 367 mg of HB(PZ)$_3$)ZrCl$_3$. After filtering and recrystallization, ($\eta^5$-C$_5$Me$_5$) [HB(PZ)$_3$]ZrCl$_2$ was obtained as reaction product.

EXAMPLE 5

Preparation of ($\eta^5$-C$_5$H$_5$) [HB(PZ)$_3$]Zr(CH$_3$)$_2$ 440 mg of the reaction product from Example 1, ($\eta^5$-C$_5$H$_5$) [HB(PZ)$_3$]ZrCl$_2$, was dissolved in ether and reacted with a MeLi solution for 3 hours. After filtration to remove LiCl, the filtrate was removed and dried to obtain a white solid ($\eta^5$-C$_5$H$_5$) [HB(PZ)$_3$]Zr(CH$_3$)$_2$.

EXAMPLE 6

Preparation of ($\eta^5$-C$_{H5}$) [H$_2$B(PZ)$_2$]Ti(CH$_3$)$_2$

The reaction procedure in Example 6 was identical to that in Example 5, except the reaction product from Example 2, ($\eta^5$-C$_5$H$_5$) [H$_2$B(PZ)$_2$]TiCl$_2$, instead of ($\eta^5$-C$_5$H$_5$) [HB(PZ)$_3$]ZrCl$_2$, was used as a reactant. After filtration and drying, a solid ($\eta^5$-C$_5$H$_5$) [H$_2$B(PZ)$_2$]Ti(CH$_3$)$_2$ was obtained as product.

EXAMPLE 7

Preparation of ($\eta^5$-C$_5$Me$_5$) [HB(PZ)$_3$]Hf(CH$_3$)$_2$

The reaction procedure in Example 7 was identical to that in Example 5, except the reaction product from Example 3 ($\eta^5$-C$_5$Me$_5$) [HB(PZ)$_3$]HfCl$_2$, instead of ($\eta^5$-C$_5$H$_5$) [HB(PZ)$_3$]ZrCl$_2$, was used as a reactant. After filtration and drying, a solid ($\eta^5$-C$_5$Me$_5$) [HB(PZ)$_3$]Hf(CH$_3$)$_2$ was obtained as product.

EXAMPLE 8

Preparation of ($\eta^5$-C$_5$Me$_5$) [HB(PZ)$_3$]Ti(CH$_3$)$_2$

The reaction procedure in Example 8 was identical to that in Example 5, except the reaction product from Example 4 ($\eta^5$-C$_5$Me$_5$) [HB(PZ)$_3$]TiCl$_2$, instead of ($\eta^5$-C$_5$H$_5$) [HB(PZ)$_3$]ZrCl$_2$, was used as a reactant. After filtration and drying, a solid ($\eta^5$-C$_5$Me$_5$) [HB(PZ)$_3$]Ti(CH$_3$)$_2$ was obtained as product.

EXAMPLE 9

Ethylene Polymerization

A stainless pressure reactor vessel having a capacity of 500 ml was obtained which was provided with five ports at top thereof for connection with a stirrer, a temperature controller, an ethylene feed inlet, a catalyst feed, and a safety valve, respectively. The reactor vessel was thoroughly washed and dried at 110° C. for 18 hours before use. Before charging, nitrogen gas was introduced to purge oxygen from the reactor. The reactor temperature was adjusted to 50° C., then 200 ml of toluene, which had been distilled and degassed, was added. Thereafter, 1.94 M of methyl aluminoxane dissolved in 4 ml toluene was charged into the reactor, followed by 2.27×10$^{-3}$ mmol of the ($\eta^5$-C$_5$H$_5$) [HB(PZ)$_3$]ZrCl$_2$ prepared from Example 1 dissolved in 4 ml toluene. After being stirred at 50° C. for 5 minutes, the reactor temperature was raised to 80° C., then ethylene gas at 150 psig was introduced into the reactor and the reaction was continued for 30 minutes.

After the completion of the polymerization reaction, the ethylene pressure was released. Then 10 ml of isopropanol was charged into the reactor so as to deactivate the catalyst/co-catalyst. After filtration and drying (at 110° C. for 18 hours), a polyethylene product was obtained. The activity of the catalyst was calculated to be 1.2×10$^5$ gPE/gZr·hr, and the melting point of the polyethylene product so obtained was measured to be 127° C.

EXAMPLE 10

Ethylene Polymerization

The reaction procedure in Example 10 was identical to that described in Example 9, except that the catalyst contained the ($\eta^5$-C$_5$H$_5$) [H$_2$B(PZ)$_2$]TiCl$_2$ obtained from Example 2, instead of ($\eta^5$-C$_5$H$_5$) [HB(PZ)$_3$]ZrCl$_2$. The activity of the catalyst was calculated to be 2.4×10$^4$ gPE/gZr·hr, and the melting point of the polyethylene product so obtained was measured to be 133° C.

EXAMPLE 11

Ethylene Polymerization

The reaction procedure in Example 11 was identical to that described in Example 9, except that the catalyst contained the ($\eta^5$-C$_5$Me$_5$) [HB(PZ)$_3$]HfCl$_2$ obtained from Example 3, instead of ($\eta^5$-C$_5$H$_5$) [HB(PZ)$_3$]ZrCl$_2$. The activity of the catalyst was calculated to be 3.62×10$^3$ gPE/gHf·hr, and the melting point of the polyethylene product so obtained was measured to be 132° C.

EXAMPLE 12

Ethylene Polymerization

The reaction procedure in Example 12 was identical to that described in Example 9, except that the catalyst contained the $(\eta^5\text{-}C_5Me_5)$ [HB(PZ)$_3$]ZrCl$_2$ obtained from Example 4, instead of $(\eta^5\text{-}C_5H_5)$ [HB(PZ)$_3$]ZrCl$_2$. The activity of the catalyst was calculated to be $1.2\times10^4$ gPE/gHf·hr, and the melting point of the polyethylene product so obtained was measured to be 134° C.

EXAMPLE 13

(Comparative Example) Ethylene Polymerization

The reaction procedure in Example 13 was identical to that described in Example 9, except that the catalyst contained $1.97\times10^{-3}$ mmole ($^n$BuC$_5$H$_4$)$_2$ZrCl$_2$. The activity of the catalyst was calculated to be $2.1\times10^5$ gPE/gZr·hr, and the melting point of the polyethylene product so obtained was measured to be 136° C.

EXAMPLE 14

(Comparative Example) Ethylene Polymerization

The reaction procedure in Example 14 was identical to that described in Example 9, except that the catalyst contained $1.97\times10^{-3}$ mmole $(\eta^5\text{-}C_5Me_4\ SiMe_2N'Bu)TiCl_2$. The activity of the catalyst was calculated to be $4.8\times10^4$ gPE/gZr·hr, and the melting point of the polyethylene product so obtained was measured to be 134° C.

EXAMPLE 15

Ethylene Polymerization

A stainless pressure reactor vessel having a capacity of 500 ml was obtained which was provided with five ports at top thereof for connection with a stirrer, a temperature controller, an ethylene feed inlet, a catalyst feed inlet, and a safety valve, respectively. The reactor vessel was thoroughly washed and dried at 110° C. for 18 hours before use. Before charging of reactant and catalyst feed, nitrogen gas was charged to purge oxygen from the reactor. The reactor temperature was adjusted to 50° C., then 200 ml of toluene, which had been distilled and degassed, was added. Thereafter, 12 ml of toluene containing 15 wt % of triisopropylaluminum was charged into the reactor A co-catalyst composition was prepared by dissolving first $2.5\times10^{-3}$ mmol of N,N'-dimethylaniline cation tetrakis(pentafluorophenyl) borate in 5 ml toluene then dissolving $2.5\times10^{-3}$ mmol of the $(\eta^5\text{-}C_5H_5)$ [HB(PZ)$_3$]Zr(CH$_3$)$_2$ prepared from Example 5 in another 5 ml toluene, and mixing the two solutions together for 5 minutes. Then the mixed co-catalyst composition was charged into the reactor. After stirred at 50° C. for 5 minutes, the reactor temperature was raised to 80° C., then ethylene gas at 150 psig was introduced into the reactor and the reaction was continued for 30 minutes.

After the completion of the polymerization reaction, the ethylene pressure was released. Then 10 ml of isopropanol was charged into the reactor so as to deactivate the catalyst/co-catalyst. After filtration and drying (at 110° C. for 18 hours), a polyethylene product was obtained. The activity of the catalyst was calculated to be $1.2\times10^5$ gPE/gZr·hr, and the melting point of the polyethylene product so obtained was measured to be 127° C.

EXAMPLE 16

Ethylene/1-Hexene Copolymerization

The stainless pressure reactor vessel used in Example 9 was used in this example. The reactor vessel was thoroughly washed and dried at 110° C. for 18 hours before use. Before charging the feed, nitrogen gas was charged to purge oxygen from the reactor. The reactor temperature was adjusted to 50° C., then 200 ml of toluene, which had been distilled and degassed, was added. Thereafter, 10 wt % of 1-hexene was charged into the reactor, followed by 1.96 M methyl aluminoxane in 4 ml toluene and then $2.4\times10^{-3}$ mmol $(\eta^5\text{-}C_{H5})$ [HB(PZ)$_3$]ZrCl$_2$ (prepared in Example 1) contained in 14 ml toluene. The rest of the procedure was identical to that described in Example 9. After the copolymerization reaction, the activity of the catalyst was calculated to be $1\times10^5$ gPE/gZr·hr, and the melting point of the polyethylene product so obtained was measured to be 131° C.

EXAMPLE 16

Ethylene/1-Hexene Copolymerization

The stainless pressure reactor vessel used in Example 9 was used in this example. The reactor vessel was thoroughly washed and dried at 110° C. for 18 hours before use. Before charging of the feed streams, nitrogen gas was charged to purge oxygen from the reactor. The reactor temperature was adjusted to 50° C., then 200 ml of toluene, which had been distilled and degassed, was added. Thereafter, 35 wt % of 1-hexene was charged into the reactor, followed by 1.96 M methyl aluminoxane in 4 ml toluene and then $2.4\times10^{-3}$ mmol $(\eta^5\text{-}C_5H_5)$ [HB(PZ)$_3$]ZrCl$_2$ (prepared in Example 1) contained in 14 ml toluene. The rest of the procedure was identical to that described in Example 9. After the copolymerization reaction, the activity of the catalyst was calculated to be $1\times10^5$ gPE/gZr·hr, and the melting point of the polyethylene product so obtained was measured to be 129° C.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A catalyst composition for catalyzing the polymerization of ethylene, said catalyst composition comprising a metallocene compound represented by the formula $(C_5R_nH_{5-n})(L)MXY$ or the formula $(C_5R_nH_{5-n})(L)MX^+A^-$; wherein:

(a) $C_5R_nH_{5-n}$ is a substituted or unsubstituted cyclopentadienyl group;

(b) L is tetrapyrazolyl borate, hydrotrispyrazolyl borate, dihydrotrispyrazolyl borate or hydrotris-3,5-dimethyl borate pyrazolyl;

(c) M is Group IVB metal;

(d) X is a $C_1$ to $C_4$ alkyl or alkenyl group, an aromatic group, an alkylaryl, a halogen, a hydrogen, or a silane group;

(e) Y, which can the same as or different from X, is a $C_1$ to $C_4$ alkyl or alkenyl group, an aromatic group, an alkylaryl, a halogen, a hydrogen, or a silane group; and (f) A is non-coordinated or loosely coordinated bulky anion; and (g) said catalyst composition further comprises an alkyl aluminoxane cocatalyst such that the ratio between the aluminum atoms and the Group IVB metal atoms ranges from 15:1 to $3\times10^4$:1.

2. A catalyst composition for catalyzing the polymerization of ethylene according to claim 1 wherein said metallocene compound is represented by one of the formulas selected from the group consisting of:

(a) $(\eta^5\text{-}C_5H_5)[HB(PZ)_3]ZrCl_2$, (b) $(\eta^5\text{-}C_5H_5)[H_2B(PZ)_2]TiCl_2$ (c) $(\eta^5\text{-}C_5Me_5)[HB(PZ)_3]HfCl_2$, (d) $(\eta^5\text{-}C_5Me_5)[HB(PZ)_3]ZrCl_2$, (e) $(\eta^5\text{-}C_5H_5)[HB(PZ)_3]Zr(CH_3)_2$, (f) $(\eta^5\text{-}C_5H_5)[H_2B(PZ)_2]Ti(CH_3)_2$, (g) $(\eta^5\text{-}C_5Me_5)[HB(PZ)_3]Hf(CH_3)_2$, and (f) $(\eta^5\text{-}C_5Me_5)[HB(PZ)_3]Ti(CH_3)_2$; and further wherein $\eta^5\text{-}C_5H_5$ represents a cyclopentadienyl group, Me represents a methyl group, and PZ represents a pyrazolyl group.

3. A catalyst composition for catalyzing the polymerization of ethylene according to claim 1 wherein said metallocene compound is represented by the formula of $(\eta^5\text{-}C_5H_5)[HB(PZ)_3]ZrCl_2$, and further wherein $\eta^5\text{-}C_5H_5$ represents a cyclopentadienyl group, and $(PZ)_3$ represents a trispyrazolyl group.

4. A catalyst composition for catalyzing the polymerization of ethylene according to claim 1 wherein said metallocene compound is represented by the formula of $(\eta^5\text{-}C_5H_5)[H_2B(PZ)_2]TiCl_2$, and further wherein $\eta^5\text{-}C_5H_5$ represents a cyclopentadienyl group, and $(PZ)_2$ represents a bispyrazolyl group.

5. A catalyst composition for catalyzing the polymerization of ethylene according to claim 1 wherein said metallocene compound is represented by the formula of $(\eta^5\text{-}C_5Me_5)[HB(PZ)_3]HfCl_2$, and further wherein Me represents a methyl group, $\eta^5\text{-}C_5Me_5$ represents a pentamethyl substituted cyclopentadienyl group, and $(PZ)_3$ represents a trispyrazolyl group.

6. A catalyst composition for catalyzing the polymerization of ethylene according to claim 1 wherein said metallocene compound is represented by the formula of $(\eta^5\text{-}C_5Me_5)[HB(PZ)_3]ZrCl_2$, and further wherein Me represents a methyl group, $\eta^5\text{-}C_5Me_5$ represents a pentamethyl substituted cyclopentadienyl group, and $(PZ)_3$ represents a trispyrazolyl group.

7. A catalyst composition for catalyzing the polymerization of ethylene according to claim 1 wherein said metallocene compound is represented by the formula of $(\eta^5\text{-}C_5H_5)[HB(PZ)_3]Zr(CH_3)_2$, and further wherein $\eta^5\text{-}C_5H_5$ represents a cyclopentadienyl group, and $(PZ)_3$ represents a trispyrazolyl group.

8. A catalyst composition for catalyzing the polymerization of ethylene according to claim 1 wherein said metallocene compound is represented by the formula of $(\eta^5\text{-}C_5H_5)[H_2B(PZ)_2]Ti(CH_3)_2$, and further wherein $\eta^5\text{-}C_5H_5$ represents a cyclopentadienyl group, and $(PZ)_2$ represents a bispyrazolyl group.

9. A catalyst composition for catalyzing the polymerization of ethylene according to claim 1 wherein said metallocene compound is represented by the formula of $(\eta^5\text{-}C_5Me_5)[HB(PZ)_3]Hf(CH_3)_2$, and further wherein Me represents a methyl group, $\eta^5\text{-}C_5Me_5$ represents a pentamethyl substituted cyclopentadienyl group, and $(PZ)_3$ represents a trispyrazolyl group.

10. A catalyst composition for catalyzing the polymerization of ethylene according to claim 1 wherein said metallocene compound is represented by the formula of $(\eta^5\text{-}C_5Me_5)[HB(PZ)_3]Ti(CH_3)_2$, and further wherein Me represents a methyl group, $\eta^5\text{-}C_5Me_5$ represents a pentamethyl substituted cyclopentadienyl group, and $(PZ)_3$ represents a trispyrazolyl group.

11. A catalyst composition for catalyzing the polymerization of ethylene according to claim 1 wherein said alkyl aluminoxane contains a repeating unit represented by the following formula:

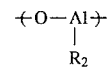

wherein $R_2$ is a $C_1$ to $C_4$ alkyl or alkenyl group, or an aromatic or alkylaryl group.

12. A catalyst composition for catalyzing the polymerization of ethylene according to claim 11 wherein said alkyl aluminoxane is methyl aluminoxane.

13. A catalyst composition for catalyzing the polymerization of ethylene according to claim 11 wherein said alkyl aluminoxane is ethyl aluminoxane.

14. A catalyst composition for catalyzing the polymerization of ethylene according to claim 11 which further comprises a trisalkylaluminum or a bisalkylaluminum, wherein the alkyl groups in said trisalkylaluminum or bisalkylaluminum are $C_1$ to $C_8$ alkyl groups.

15. A catalyst composition for catalyzing the polymerization of ethylene according to claim 14 wherein said alkyl aluminoxane and said tris- or bisalkylaluminum are provided such that the ratio between the total aluminum atoms and the Group IVB metal atoms ranges from 15:1 to $3\times10^4$:1 and the ratio between said trisalkylaluminum or bisalkylaluminum, or the sum thereof, and said alkyl aluminoxane ranges between 0% and 80%.

16. A process for the polymerization of ethylene comprising the steps of:

(a) preparing a reaction mixture containing ethylene and a catalyst composition;

(b) reacting said reaction mixture to obtain polyethylene;

(c) wherein said catalyst composition comprises a metallocene compound represented by the formula $(C_5R_nH_{5-n})(L)MXY$ or formula $(C_5R_nH_{5-n})(L)MX^+A^-$ wherein:

(i) $C_5R_nH_{5-n}$ is a substituted or unsubstituted cyclopentadienyl group;

(ii) L is tetrapyrazolyl borate, hydrotrispyrazolyl borate, dihydrotrispyrazolyl borate or hydrotris-3,5-dimethyl borate pyrazolyl;

(iii) M is Group IVB metal;

(iv) X is a $C_1$ to $C_4$ alkyl or alkenyl group, an aromatic group, an alkylaryl, a halogen, a hydrogen, or a silane group;

(v) Y, which can the same as or different from X, is a $C_1$ to $C_4$ alkyl or alkenyl group, an aromatic group, an alkylaryl, a halogen, a hydrogen, or a silane group; and (vi) A is non-coordinated or loosely coordinated bulky anion;

(d) further wherein:
  (i) said catalyst composition further comprises an alkyl aluminoxane, which contains a repeating unit represented by the following formula:

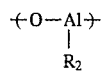

wherein $R_2$ is a $C_1$ to $C_4$ alkyl or alkenyl group, or an aromatic or alkylaryl group; and
  (ii) wherein said alkyl aluminoxane is provided such that the ratio between the aluminum atoms and the Group VB, Group IVB, or Group VB metal atoms ranges from 15:1 to $3 \times 10^4$:1.

17. A process for the polymerization of ethylene according to claim 16 wherein:
  (a) said catalyst composition further comprises a trisalkylaluminum or a bisalkylaluminum, wherein the alkyl groups in said trisalkylaluminum or bisalkylaluminum are $C_1$ to $C_8$ alkyl groups; and
  (b) said alkyl aluminoxane and said tris- or bisalkylaluminum are provided such that the ratio between the total aluminum atoms and the Group IVB metal atoms ranges from 15:1 to $3 \times 10^4$:1, and the ratio between said trisalkylaluminum and/or bisalkylaluminum and said alkyl aluminoxane ranges between 0% and 80%.

* * * * *